(12) United States Patent
Tani

(10) Patent No.: US 10,549,750 B2
(45) Date of Patent: Feb. 4, 2020

(54) MOVING BODY

(71) Applicant: Sharp Kabushiki Kaisha, Sakai, Osaka (JP)

(72) Inventor: Daisuke Tani, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 250 days.

(21) Appl. No.: 15/519,265

(22) PCT Filed: Sep. 3, 2015

(86) PCT No.: PCT/JP2015/075074
§ 371 (c)(1),
(2) Date: Apr. 14, 2017

(87) PCT Pub. No.: WO2016/059905
PCT Pub. Date: Apr. 21, 2016

(65) Prior Publication Data
US 2017/0240170 A1    Aug. 24, 2017

(30) Foreign Application Priority Data
Oct. 17, 2014    (JP) .................................. 2014-212546

(51) Int. Cl.
*B60W 30/09* (2012.01)
*G08G 1/16* (2006.01)
(Continued)

(52) U.S. Cl.
CPC ........... *B60W 30/09* (2013.01); *G05D 1/0088* (2013.01); *G05D 1/0274* (2013.01); *G08G 1/16* (2013.01);
(Continued)

(58) Field of Classification Search
CPC .. B60W 30/09; B60W 30/143; B60W 30/146; B60W 30/162; B60W 30/165;
(Continued)

(56) References Cited

U.S. PATENT DOCUMENTS

2005/0251323 A1* 11/2005 Heinrichs-Bartscher ................... B60K 31/0008
701/117
2013/0184926 A1* 7/2013 Spero ....................... B62D 1/28
701/26
(Continued)

FOREIGN PATENT DOCUMENTS

JP    07-065297 A    3/1995
JP    2008-049932 A    3/2008

OTHER PUBLICATIONS

Official Communication issued in International Patent Application No. PCT/JP2015/075074, dated Oct. 13, 2015.

*Primary Examiner* — Adam R Mott
(74) *Attorney, Agent, or Firm* — Keating & Bennett, LLP

(57) ABSTRACT

A moving body (1) according to the invention includes: a drive unit (12); a control unit (exemplified by a drive control unit (11) and a speed instruction unit (10b)) that controls driving by the drive unit (12); an object recognition unit (13) that recognizes an object; and a determination unit (exemplified by a degree-of-risk determination unit (10a)) that, in accordance with a recognition result by the object recognition unit (13), determines a degree of risk of collision with the object. In a case where determination is made as being risky by the determination unit, the control unit performs control of reducing a target speed of the moving body (1), and returns the target speed of the moving body (1) to the original one, in a case where determination is made as being
(Continued)

safe by the determination unit for a predetermined period in a state where the target speed has been reduced.

16 Claims, 10 Drawing Sheets

(51) Int. Cl.
     *G05D 1/00*         (2006.01)
     *G05D 1/02*         (2006.01)

(52) U.S. Cl.
     CPC ..... *B60W 2420/62* (2013.01); *B60W 2550/10* (2013.01); *B60W 2720/125* (2013.01)

(58) Field of Classification Search
     CPC ..... B60W 30/17; G05D 1/0238; G05D 1/024; G05D 1/0242; G05D 1/0223; G05D 1/0088; G05D 1/0274; G06K 9/00805; G01S 17/936; G08G 1/16; B25J 9/1666; B25J 9/1676; B60T 7/22
     See application file for complete search history.

(56) References Cited

U.S. PATENT DOCUMENTS

2014/0207357 A1*  7/2014  Shimotani ........ G08G 1/096725
                                                    701/93
2015/0245962 A1*  9/2015  Furuta ...................... A61G 5/04
                                                    700/257

* cited by examiner

| TIME | ●:MEASUREMENT POINT | NUMBER OF MEASUREMENT POINTS AT EACH OF WHICH DISTANCE IS SHORT | DETERMINATION RESULT (THRESHOLD: 10) | TARGET SPEED |
|---|---|---|---|---|
| 0 |  | 0 | SAFE | HIGH SPEED |
| 1 |  | 7 | SAFE | HIGH SPEED |
| 2 |  | 14 | RISKY | LOW SPEED |
| 3 |  | 7 | SAFE | HIGH SPEED |
| 4 |  | 14 | RISKY | LOW SPEED |

FIG.4A

| TIME | ●:MEASUREMENT POINT | NUMBER OF MEASUREMENT POINTS AT EACH OF WHICH DISTANCE IS SHORT | DETERMINATION RESULT (THRESHOLD: 10) | TARGET SPEED | SAFETY COUNTER |
|---|---|---|---|---|---|
| 0 | | 14 | RISKY | LOW SPEED | 0 |
| 1 | | 7 | SAFE | LOW SPEED | 1 |
| 2 | | 14 | RISKY | LOW SPEED | 0 |
| 3 | | 7 | SAFE | LOW SPEED | 1 |
| 4 | | 14 | RISKY | LOW SPEED | 0 |
| 5 | | 7 | SAFE | LOW SPEED | 1 |
| 6 | | 0 | SAFE | LOW SPEED | 2 |
| 7 | | 0 | SAFE | LOW SPEED | 3 |
| 8 | | 0 | SAFE | LOW SPEED | 4 |
| 9 | | 0 | SAFE | HIGH SPEED | (5) |
| 10 | | 0 | SAFE | HIGH SPEED | — |

| TIME | ●:MEASUREMENT POINT | NUMBER OF MEASUREMENT POINTS AT EACH OF WHICH DISTANCE IS SHORT | DETERMINATION RESULT (THRESHOLD: 10) | TARGET SPEED | SAFETY COUNTER |
|---|---|---|---|---|---|
| 0 |  | 14 | RISKY | STOP | 0 |
| 1 |  | 7 | SAFE | STOP | 1 |
| 2 |  | 14 | RISKY | STOP | 0 |
| 3 |  | 7 | SAFE | STOP | 1 |
| 4 |  | 14 | RISKY | STOP | 0 |
| 5 |  | 7 | SAFE | STOP | 1 |
| 6 |  | 0 | SAFE | STOP | 2 |
| 7 |  | 0 | SAFE | STOP | 3 |
| 8 |  | 0 | SAFE | LOW SPEED | ④ |
| 9 |  | 0 | SAFE | LOW SPEED | — |
| 10 |  | 0 | SAFE | LOW SPEED | — |

MOVING BODY

TECHNICAL FIELD

The present invention relates to a moving body, and, more specifically, relates to a moving body that includes an object recognition unit.

BACKGROUND ART

Conventionally, various types of moving bodies for carrying people or things have been distributed. Moreover, a moving body of an autonomous traveling type has been proposed as a moving body, and thereby is able to be used not only for transportation but also for monitoring (guard) of surroundings. Then, regardless of being used for transportation or being used for monitoring, and regardless of being the autonomous traveling type or not, some moving bodies have an object recognition unit mounted thereon. The object recognition unit is provided for avoiding collision with another moving body or an obstacle, and examples thereof include an active sensor for sensing an obstacle or one that recognizes an obstacle from a captured image by using a camera that photographs surroundings in a front side or the like. Examples of the active sensor include a radio wave radar and a laser range finder which utilize a reflected wave.

Patent Literature 1 discloses a contact avoidance support apparatus of a vehicle, which supports contact avoidance with an obstacle by, when a front-side obstacle sensor senses a distance of an obstacle in front of a vehicle, calculating a target speed of the vehicle in accordance with the distance to the obstacle and controlling a braking force on the basis of the target speed. Note that, in the apparatus, the calculated target speed is corrected in accordance with any of a steering angle and a steering angle speed of a steering wheel and accelerator opening by an operation of a driver.

Description will be given for setting of a target speed of an obstacle sensing vehicle with use of a technique according to Patent Literature 1 by taking a laser range finder as an example of the front-side obstacle sensor with reference to FIG. 1A to FIG. 2B. A laser range finder F illustrated in FIG. 1A emits laser light from a light emission surface Fa thereof, and, in a case of assuming a flat plane that is distant by a predetermined distance, scans it at a scanning pitch H in a horizontal direction and at a scanning pitch V in a vertical direction, receives a reflected wave at each scanning point, and measures a distance d by a reception timing thereof. In this manner, the laser range finder F is able to recognize an object (and measure a distance) within the distance d, in which detection is possible, as to each of measurement points prescribed by the scanning pitches H and V.

FIG. 1B illustrates a top view of the laser range finder F of FIG. 1A. In a case where there is an obstacle D, the obstacle D is able to be recognized at a position of a distance d1, as exemplified in FIG. 1C in which a viewpoint is similar to that of FIG. 1B. Moreover, it is possible to recognize a shape and a depth of the obstacle D by distribution of the distance d1. When description is given with a viewpoint facing a front side from the light emission surface Fa, the obstacle D is to be recognized at a position exemplified in FIG. 1D. Note that, in FIG. 1D, an example in which the obstacle D has a stick shape is cited for simplification.

By using such a laser range finder F (one that has measurement points each 16 points of which are arrayed in the horizontal direction and each 10 points of which are arrayed in the vertical direction as illustrated in FIG. 1D), an obstacle is recognized, and a target speed is set in accordance with the recognized obstacle (part surrounded by a rectangular) D.

Description will be given specifically with reference to FIG. 2A. A case where an obstacle (object) is to go across from the right to the left in a front side of the laser range finder F is cited here as an example. In this case, as time elapses as time 0, 1, 2, 3, and 4, the number of measurement points at each of which the laser range finder F measures a distance to be short changes to 0, 7, 14, 7, and 14, respectively. It is set that the time 0 is time when determination is made as being risky while a moving body that mounts the laser range finder F thereon is traveling at high speed. When a threshold of the determination is set to be 10 here, determination is made as being risky in a case where the number of measurement points at each of which a distance is shorter than a predetermined distance is 10 or more, and when determination is made as being risky, the target speed is set to be a value of a low speed, and when determination is made as being safe, the target speed is set to be a value of a high speed. Thereby, a speed of the moving body changes as illustrated in FIG. 2B.

CITATION LIST

Patent Literature

Patent Literature 1: Japanese Laid-Open Patent Publication No. 2008-49932

SUMMARY OF THE INVENTION

Technical Problems

However, when the target speed is set with a setting method described above, as is clear from the change in the speed of the moving body, which is illustrated in FIG. 2B, deceleration, acceleration, and deceleration are performed with lapse of time, so that acceleration and deceleration are to be repeated. Then, due to such repetition of acceleration and deceleration, not only risk is increased but also a load on the moving body itself is increased, so that risk of malfunction is increased and an amount of consumption of energy of a battery, gasoline, or the like becomes large. Note that, though the calculated target speed is corrected in accordance with an operation state by the driver in the technique according to Patent Literature 1, there is still a tendency of such repetition.

The present invention has been made in view of circumstances as described above, and an object thereof is to inhibit superfluous repetition of acceleration and deceleration caused by object recognition results, in a moving body which determines risk of collision with an object in accordance with the object recognition results and sets a target speed.

Means for Solving the Problems

In order to solve the aforementioned problems, first technical means of the invention is a moving body, including: a drive unit; a control unit that controls driving by the drive unit; and an object recognition unit that recognizes an object, in which a determination unit that determines a degree of risk of collision with the object in accordance with a recognition result by the object recognition unit is included, and the control unit, in a case where determination is made as being risky by the determination unit, performs control of reducing a target speed of the moving body, and returns the target speed of the moving body to the original one, in a case where determination is made as being safe by the determination unit for a predetermined period in a state where the target speed has been reduced.

According to a second technical means of the invention, in the first technical means, the determination unit includes a plurality of determination conditions that are to be used at a time of making determination as being risky, and the control unit changes the predetermined period in accordance with at least one of the plurality of determination conditions that are to be used by the determination unit.

According to a third technical means of the invention, in the first technical means, the control unit, in a case where determination is made as being risky by the determination unit while traveling at a first target speed, performs control of reducing the target speed of the moving body to a second target speed or by a predetermined speed, and returns the target speed of the moving body to the first target speed in a case where determination is made as being safe by the determination unit for the predetermined period in a state where the target speed has been reduced to the second target speed or by the predetermined speed, and changes the predetermined period in accordance with the first target speed, the second target speed, or the predetermined speed.

According to a fourth technical means of the invention, in the third technical means, a case where the second target speed is 0 is included.

According to a fifth technical means of the invention, in the third or fourth technical means, the determination unit includes a plurality of determination conditions that are to be used at a time of making determination as being risky, and the control unit changes the predetermined period in accordance with at least one of the plurality of determination conditions that are to be used by the determination unit.

A sixth technical means of the invention includes, in any one of the first to fifth technical means: a storage unit that stores map information that includes a scheduled traveling route of the moving body; and a position-information acquisition unit that acquires position information indicating a position of the moving body, in which the control unit performs control of performing autonomous traveling along the scheduled traveling route on a basis of a current position acquired by the position-information acquisition unit.

A seventh technical means of the invention includes, in any one of the first to fifth technical means: a storage unit that stores map information that includes a scheduled traveling route of the moving body; a position-information acquisition unit that acquires position information indicating a position of the moving body; an operation unit that receives a driving operation by a driver; and a navigation unit that performs navigation on a map, which is indicated by the map information, on a basis of a current position acquired by the position-information acquisition unit.

Advantageous Effects of Invention

According to the invention, it is possible to inhibit superfluous repetition of acceleration and deceleration caused by object recognition results, in a moving body which determines risk of collision with an object in accordance with the object recognition results and sets a target speed.

BRIEF DESCRIPTION OF DRAWINGS

FIG. 4A is a view for explaining a process of, in the moving body of FIG. 3A, recognizing an obstacle with use of a laser range finder and setting a target speed in accordance with recognition results thereof.

DESCRIPTION OF EMBODIMENTS

A moving body according to the invention is, for example, a moving body that moves in a facility such as a factory or a public facility or in a site of such a facility, a parking lot, or the like, or a moving body such as a car or a motorcycle, which travels on a public road. Particularly, some of moving bodies that automatically move in a site or in a facility have a control mechanism of an autonomous traveling type. By mounting control of the autonomous traveling type, a moving body such as a car, which is basically driven by a driver, is also enabled to perform autonomous traveling or autonomous traveling as driving assistance for the driver. Moreover, the moving body according to the invention is able to be used not only for transportation to transport people or things but also for monitoring surroundings while moving, and, in this case, the moving body is able to be referred to as a monitoring robot. Hereinafter, various embodiments of the invention will be described with reference to drawings.

(First Embodiment)

A first embodiment of the invention will be described with reference to FIG. 3A to FIG. 4B. First, a configuration example of a moving body according to the present embodiment will be described with reference to a block diagram of FIG. 3A and an external view of FIG. 3B.

Figure 3A:
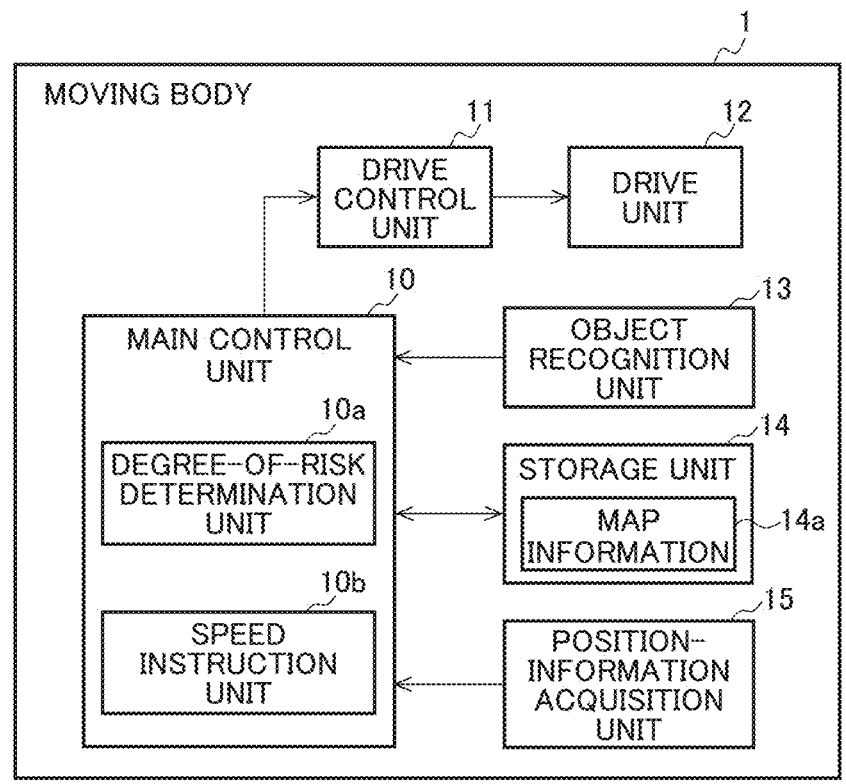
FIG. 3A is a block diagram illustrating a configuration example of a moving body according to a first embodiment of the invention.
Figure 3B:
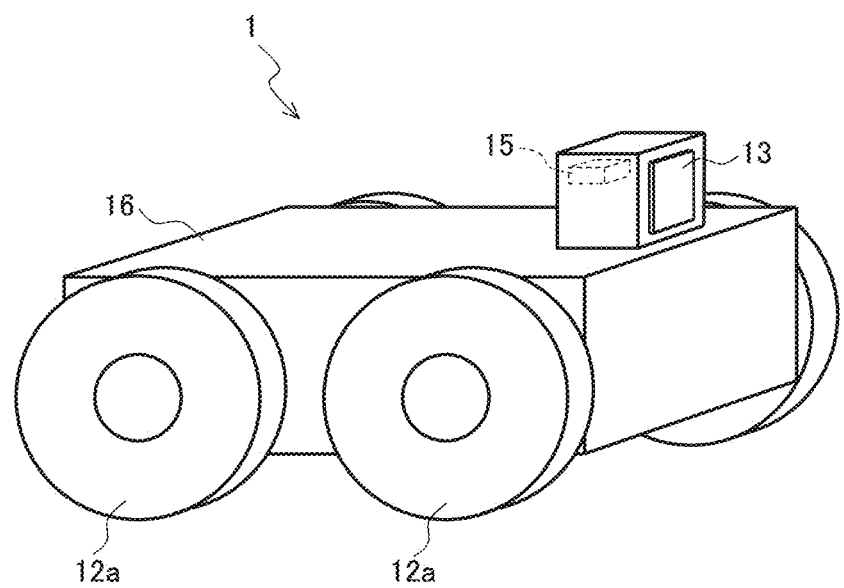
FIG. 3B is an external view illustrating an example of the moving body of FIG. 3A.

A moving body 1 is a machine that includes a moving mechanism for moving, and is able to be referred to as a moving apparatus. In the example of FIG. 3A and FIG. 3B, the moving mechanism is constituted by a drive control unit 11 and a drive unit 12 including a wheel 12a which is controlled by the drive control unit 11. The drive unit 12 includes, for example, an engine and/or a motor each of which is not illustrated. Needless to say, without limitation to the wheel 12a which is exemplified, a crawler (Caterpillar (registered trademark)) or the like may be driven, for example. Additionally, a battery (rechargeable battery) is provided in the moving body 1. The rechargeable battery is a portion that supplies power to each of functional elements of a vehicle, and a portion that supplies power to a part which realizes a function, for example, such as a traveling function, an object recognition function (in addition to an object distance detection function, a road surface determination function may be provided), a position-information acquisition function, or a communication function. For example, a lithium-ion battery, a nickel-hydrogen battery, an Ni—Cd battery, a lead battery, a fuel battery, or an air battery is used as the rechargeable battery.

In addition, the moving body 1 includes an object recognition unit 13, a storage unit 14, and a position-information acquisition unit 15, and also a degree-of-risk determination unit 10a and a speed instruction unit 10b. Though the example in which each of the units 10a and 10b is provided in a main control unit 10 that controls the moving body 1 is cited in FIG. 3A, there is no limitation thereto. Note that, the storage unit 14 and the position-information acquisition unit 15 are not necessarily provided. Moreover, the speed instruction unit 10b and the drive control unit 11 are merely examples of a control unit that controls driving by the drive unit 12.

Note that, the main control unit 10 performs control of the drive control unit 11 and reading from and writing to the storage unit 14, and is also able to be configured so as to perform control of acquisition by the position-information acquisition unit 15 and recognition by the object recognition unit 13. The main control unit 10 is constituted, for example, by a CPU (Central Processing Unit) or an MPU (Micro Processing Unit), a RAM (Random Access Memory) as a work area, and a control device such as a storage device, and a part or entirety thereof is able to be mounted as an integrated circuit/IC chip set. The storage device stores therein a control program (including a program for executing processing in each of the units 10a and 10b, which will be described below), various setting contents, and the like. Various devices such as an HDD (Hard Disk Drive) and an SSD (Solid State Drive) are able to be applied as the storage device.

The object recognition unit 13 is a part that recognizes various objects such as a plurality of fixed objects or another moving body. Basically, the object recognition unit 13 only needs to recognize a position of an object with respect to the moving body 1 (a distance and a direction from the moving body 1 to the object). Needless to say, the object recognition unit 13 has a detectable range, but a configuration by which detection is able to be performed at all angles may be adopted.

As the object recognition unit 13, a camera for capturing a still image or a moving image or the like is able to be used. Moreover, by providing two cameras or more, it is also possible to obtain parallax information. A camera is able to be referred to as an example of a passive type sensor for sensing an obstacle. Note that, a camera that captures a still image is able to cope with movement of the moving body 1 by setting a capturing interval to be short. Moreover, an active sensor for sensing an obstacle (hereinafter, active sensor) for detecting a position of an obstacle with respect to the moving body 1 may be also used as the object recognition unit 13. Further, a speed of an object is able to be calculated by the object recognition unit 13 by taking a moving speed and a traveling direction of the moving body 1 into consideration.

The aforementioned active sensor is a sensor for sensing another moving body or an obstacle in advance in order to avoid collision with them, and a sensor that actively transmits light, infrared rays, other electromagnetic waves or ultrasonic waves, or the like, and receives reflected waves of the transmitted wave to thereby sense a position of the obstacle. Various types of sensors, for example, such as a LIDAR (Light Detection and Ranging or Laser Imaging Detection and Ranging), a laser range finder, a radio wave radar (millimetric wave radar, or the like), and an ultrasonic sensor are able to be applied as the active sensor. Moreover, the active sensor may sense an obstacle, as necessary, by adopting a mechanical scanning system in which the active sensor is moved to the right and the left by a motor or an electronic scanning system in which reception is performed with use of a plurality of channels and a sensing angle is calculated by utilizing a phase difference generated between the reception channels. Note that, the laser range finder is a range finding sensor adopting a range finding system of time-of-light flight (TOF: Time of Flight), which includes one or two scanning axes to thereby be able to perform measurement of a two-dimensional plane or three-dimensional measurement, respectively. Moreover, the LIDAR is able to be referred to as one type of the laser range finder. In this manner, laser, infrared rays, visible light, ultrasonic waves, electromagnetic waves, and the like are able to be used as one that is to be radiated for sensing in the object recognition unit 13. However, it is preferable to use laser since resistance to weather and range-finding accuracy thereof are high.

In addition, as exemplified in FIG. 3B, it is preferable that the object recognition unit 13 is provided on a front side of a main body 16 of the moving body 1, but may be provided in another part as long as being able to recognize at least an object in the traveling direction. However, the object recognition unit 13 only needs to have a sensing surface (a transmission/reception unit, an antenna, or the like) provided at a position that enhances sensitivity thereof. In addition, by providing a plurality of object recognition units 13 at different positions and/or by providing a plurality of types of object recognition units 13, it is possible to recognize a position of an object in detail and accurately.

For the moving body 1, the object recognition unit 13 whose performance (including resistance to weather) or type is suitable for a traveling speed and a traveling range (for example, a range according to whether or not to be a public road or according to how large an inside of a site or an inside of a room is) which are assumed for the moving body 1 may be appropriately selected and mounted. Needless to say, performance of the object recognition unit 13 changes in accordance with costs thereof, so that one that is to be mounted may be selected by taking costs into consideration.

The storage unit 14 is a part that stores map information 14a therein. The map information 14a also includes object information that indicates positions of a plurality of fixed objects. Moreover, the map information 14a also includes information that indicates a position of a region which is passable (a road, a non-parking region of a parking lot, or the like). In a case where the moving body 1 is a monitoring robot, the map information 14a is able to be referred to as information indicating an environment map. In this case, the fixed objects may include not only a real property such as a building but also other structures such as a railway track, a garden plant and a roadside tree, and a wall and a pillar. It can be said that the fixed objects are ones that are included in a concept generally called a feature and actually exist, and ones except for a passable region (road, etc.).

The position-information acquisition unit 15 acquires position information, which indicates a position of the moving body 1, by using GPS (Global Positioning System) or the like. For example, the position-information acquisition unit 15 is composed of an antenna that receives a radio wave from a GPS satellite, an analysis unit that analyzes a received GPS signal to obtain position information (latitude and longitude), and the like. The antenna may be arranged in an appropriate position of the main body 16 of the moving body 1 such as a position of the position-information acquisition unit 15 exemplified in FIG. 3B. However, without limitation to the exemplified arrangement, the antenna may be provided at a position that enhances sensitivity thereof. Note that, the position-information acquisition unit 15 is able to improve accuracy thereof by including a DGPS (Differential GPS) function or an RTK-GPS (Real Time Kinematic GPS) function or by including a function of correcting a position on the basis of a positional relation between a wireless communication unit and a wireless communication base station. Moreover, in a case where the moving body is caused to move only in an extremely limited range such as an inside of a site or an inside of a building, rectangular coordinates, polar coordinates, or the like is also simply able to be adopted as the position information.

In addition, description is given here by citing an example in which GPS is used, other global positioning systems (regional navigation satellite systems) similar to GPS may be applied. Examples of the other global positioning system include Quasi-Zenith Satellite System (QZSS) of Japan, GLONASS (Global Navigation Satellite System) of Russia, Galileo of EU, BeiDou of China, and IRNSS (Indian Regional Navigational Satellite System) of India.

As a network of wireless communication by the above-described wireless communication unit or the like, the Internet which is open to the public or the like may be used, or a wireless network of a dedicated line, to which only a limited apparatus is able to be connected, may be used. Examples of a wireless transmission system in a wireless communication channel include systems conforming to standards of various types of wireless LANs (Local Area Network) (regardless of authentication of WiFi (registered trademark)), ZigBee (registered trademark), Bluetooth (registered trademark), LE (Low Energy), and the like, which may be used by taking a wireless reachable distance, a transmission band, or the like into consideration, and a mobile phone network or the like may be used, for example.

Supplementary description will be given for the map information 14a. For example, in a case where the moving body 1 is used for monitoring in a certain specific region such as a parking lot or an inside of a site, a scheduled traveling route is decided. Thus, the moving body 1 may store, in the storage unit 14, the scheduled traveling route of the moving body 1 as a part of the map information 14a, and perform control so as to autonomously travel along the scheduled traveling route, on the basis of a current position acquired by the position-information acquisition unit 15 (current position on a map). Note that, this control is performed by the drive control unit 11 with respect to the drive unit 12.

Supplementary description will be given for autonomous traveling. The moving body 1 may be configured to include a magnetic sensor that measures geomagnetism or the like, sense a direction, to which the magnetic sensor faces, to thereby sense the traveling direction of the moving body 1, and output a sensing result to the main control unit 10 to use it for correction of the traveling direction.

Figure 4B:
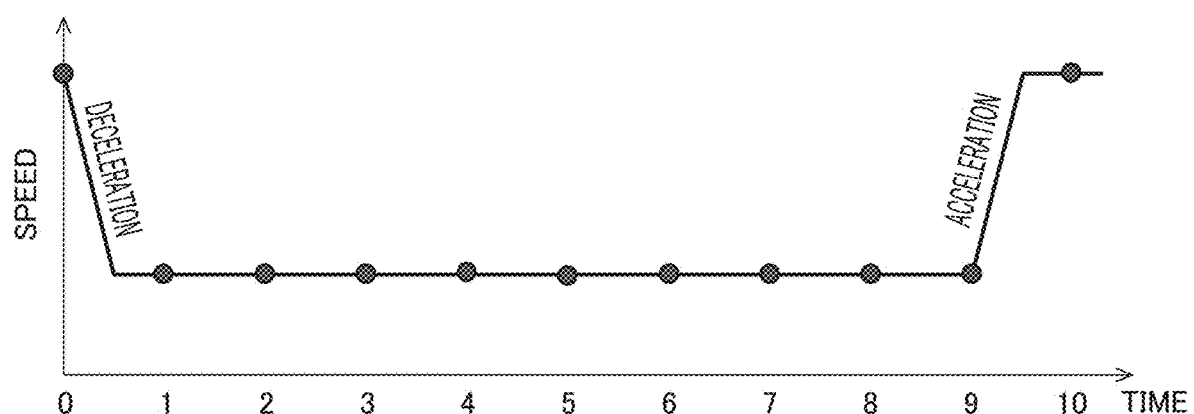
FIG. 4B is a view illustrating a change in a speed of the moving body in the process of FIG. 4A.

Next, description will be given for the degree-of-risk determination unit 10a and the speed instruction unit 10b, which are main features of the present embodiment, with reference to FIG. 4A and FIG. 4B together. FIG. 4A is a view for explaining a process of, in the moving body 1, recognizing an obstacle with use of a laser range finder and setting a target speed in accordance with recognition results thereof, and FIG. 4B is a view illustrating a change in a speed of the moving body in the process of FIG. 4A.

The degree-of-risk determination unit 10a is a determination unit that determines a degree of risk of collision with an object in accordance with a recognition result of the object recognition unit 13. The degree-of-risk determination unit 10a may determine the degree of risk in accordance with a size, a speed, and the like of an object which has been recognized.

In a case where determination is made as being risky by the degree-of-risk determination unit 10a, the control unit performs control so that a target speed of the moving body 1 is reduced, and returns the target speed of the moving body 1 to the original one when, in a state where the target speed has been reduced in accordance with the control, determination is made as being safe by the determination unit for a predetermined period (that is, continuously a predetermined number of times). Note that, in this case, the control of reducing the target speed may be control of reduction by a predetermined speed from a current speed, or may be control of reduction to a predetermined speed which is lower than the current speed.

Hereinafter, description will be given by setting that a main part of control by the control unit is setting of the target speed and the speed instruction unit 10b that performs the setting performs the control. The drive control unit 11 may perform control for driving the drive unit 12 so that the target speed becomes what has been instructed by the speed instruction unit 10b. For example, control may be performed so that the target speed is reached in a fixed period, or control may be performed until the target speed is reached at a constant acceleration degree.

Such setting of the target speed will be described with an example of FIG. 4A. In the example, the degree-of-risk determination unit 10a determines a degree of risk in accordance with a size of an object recognized by the object recognition unit 13. Similarly to the case of FIG. 2A, a laser range finder (having measurement points each 16 points of which are arrayed in a horizontal direction and each 10 points of which are arrayed in a vertical direction) is used to recognize an object (obstacle), and, when there are 10 or more measurement points whose distances are short, determination is made as being risky. Note that, an object within a detectable range of the laser range finder is able to be recognized at each of the measurement points, and thereby the detectable range of the laser range finder is defined.

Figure 1A:
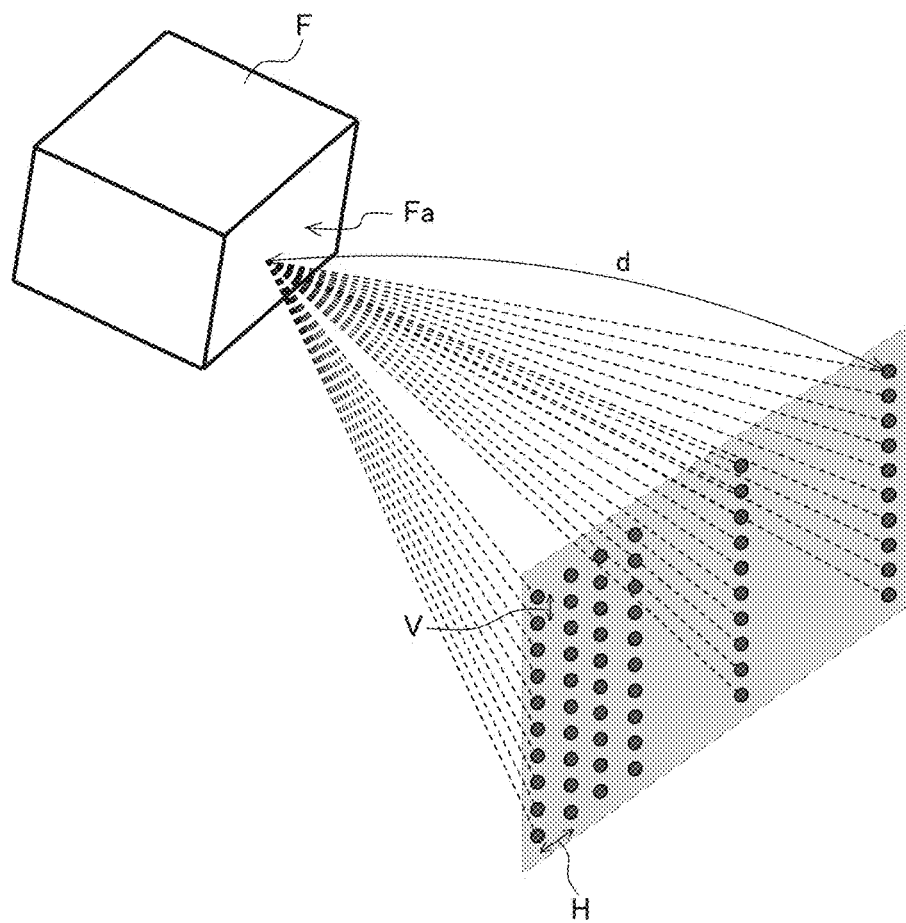
FIG. 1A is a schematic view illustrating a situation of measurement by a laser range finder.
Figure 1B:
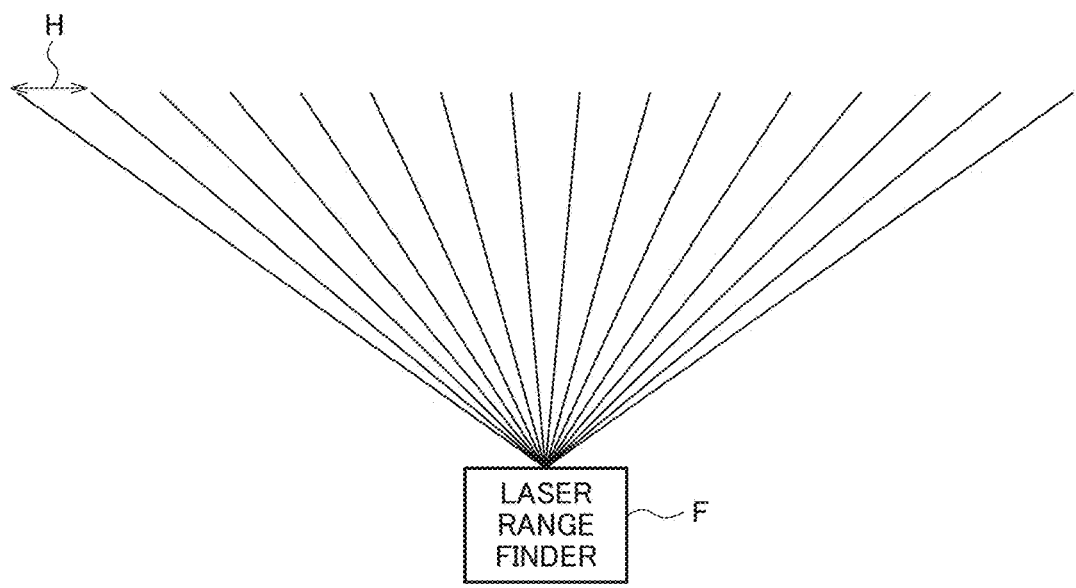
FIG. 1B is a top view of the laser range finder of FIG. 1A.
Figure 1C:
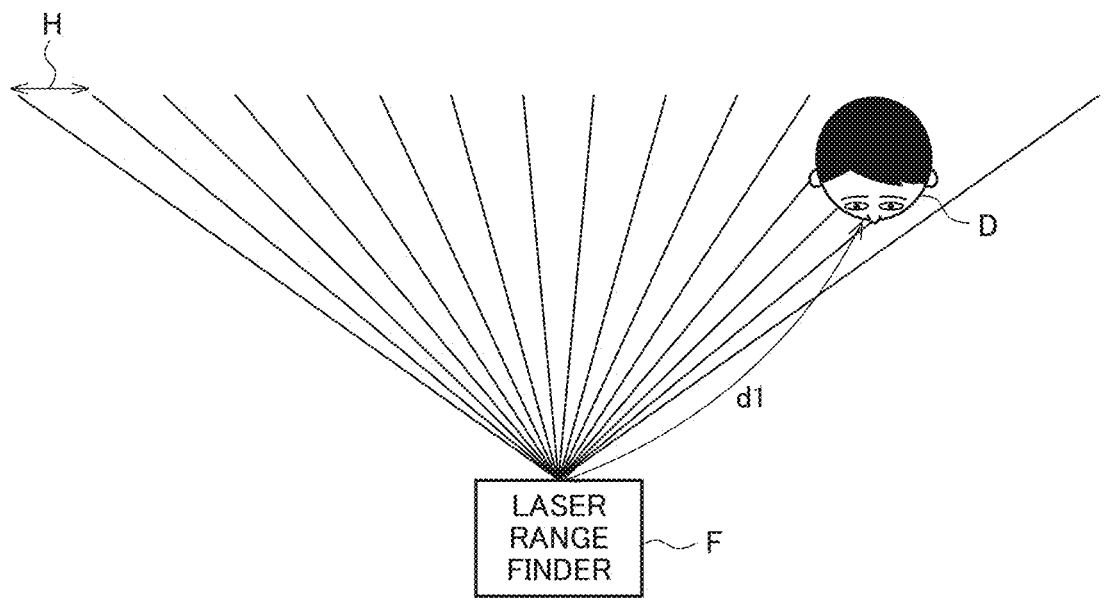
FIG. 1C is a top view of the laser range finder of FIG. 1A, which is a schematic view illustrating a situation where there is an obstacle.
Figure 1D:
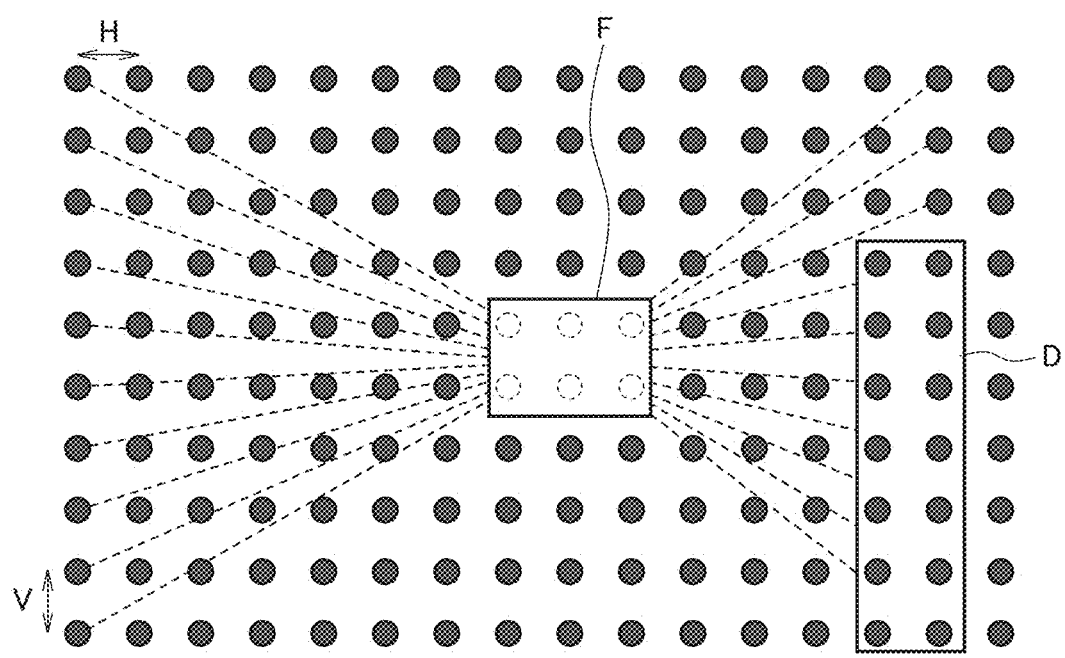
FIG. 1D is a front view of a light emission surface of the laser range finder of FIG. 1A, which is a schematic view illustrating a situation where there is an obstacle.
Figure 2A:
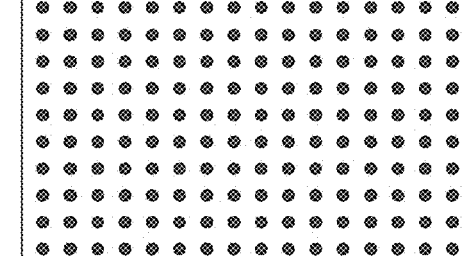
FIG. 2A is a view for explaining a process of, in a moving body, recognizing an obstacle with use of the laser range finder of FIG. 1A to FIG. 1D and setting a target speed in accordance with recognition results thereof.
Figure 2A:
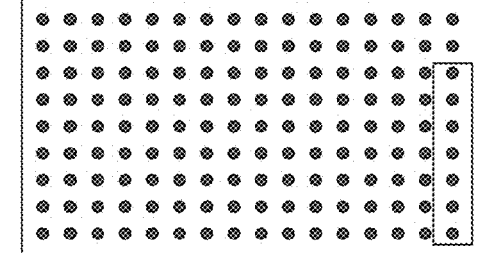
Figure 2A:
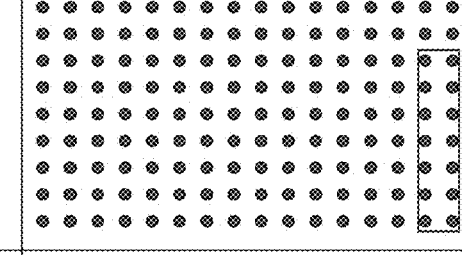
Figure 2A:
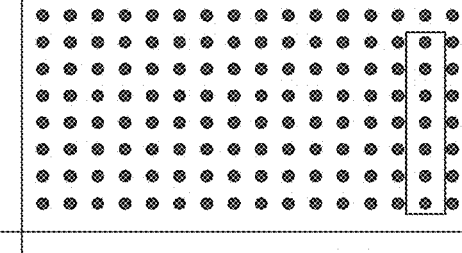
Figure 2A:
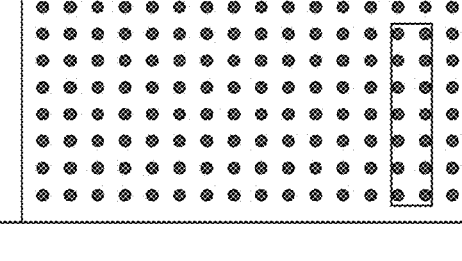
Figure 2B:
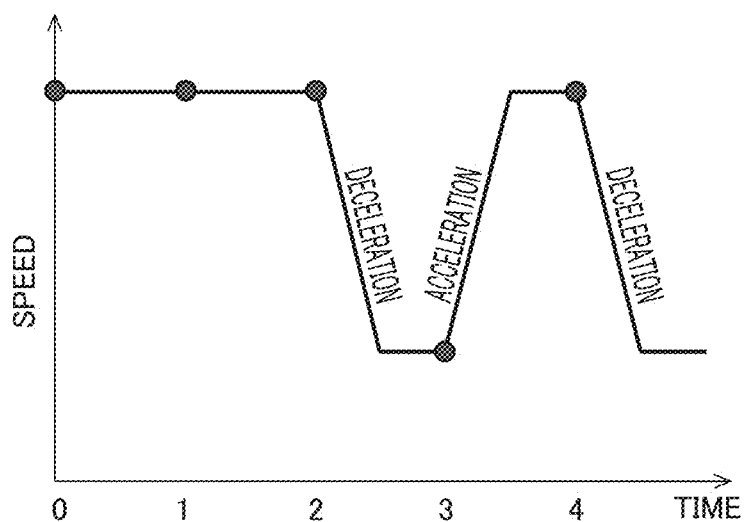
FIG. 2B is a view illustrating a change in a speed of the moving body in the process of FIG. 2A.

A case where an obstacle (object) is to go across from the right to the left in a front side of the laser range finder is cited also here as an example, similarly to FIG. 2A. Needless to say, similar processing is able to be performed by another active sensor. Although being unable to obtain information on a distance, even one camera is able to perform similar processing by performing image processing, for example, by setting the measurement points as pixel units, which will be described below.

In this example, as time elapses as time 0, 1, 2, ..., 8, 9, and 10, the number of measurement points at each of which the laser range finder measures a distance to be shorter than a predetermined distance changes to 14, 7, 14, ... , 0, 0, and 0, respectively. As results thereof, determination is made as being risky by the degree-of-risk determination unit 10*a* at the time 0, 2, and 4, and determination is made as being safe at the time other than the above. In this case, the time 0 is time when determination is made as being risky while traveling at high speed.

Then, in a case where determination is made as being risky first at the time 0 while traveling at high speed, the speed instruction unit 10*b* sets the target speed to be a low speed. At this time, a safety counter which is provided in the speed instruction unit 10*b* is set to be 0. The safety counter is a counter for counting the aforementioned predetermined number of times (in this example, five times). Even when determination is made as being safe at the time 1, since determination is made as being risky at the next time 2, a count of the safety counter is returned to 0. Then, it is only after determination is made as being safe five times continuously at the time 5 to 9 that the speed instruction unit 10*b* returns the target speed to a high speed.

With such control, acceleration is performed when there is no obstacle for a predetermined period after deceleration, so that it is possible to inhibit superfluous repetition of acceleration and deceleration caused by object recognition results, as shown in FIG. 4B which illustrates the change in the speed of the moving body 1.

(Second Embodiment)

A second embodiment of the invention will be described. Note that, in the present embodiment, though description for overlapping parts with the first embodiment will be basically omitted, various applications, for example, described in the first embodiment are able to be applied.

The degree-of-risk determination unit 10*a* in the present embodiment has a plurality of determination conditions that are to be used at a time of making determination as being risky. As the plurality of determination conditions, a plurality of types of determination conditions and/or a plurality of steps of a determination condition are cited. Examples of the types of determination conditions include, for example, (a) a condition such that determination is made as being risky in a case where a size of a recognized object is equal to or larger than a predetermined size, (b) a condition such that determination is made as being risky in a case where a size of a recognized object increases by a changing amount equal to or more than a predetermined speed, and (c) a condition such that determination is made as being risky in a case where an object is detected at a position in a predetermined detecting range which is near the center of the detectable range of the object recognition unit 13. Note that, as to (a) above, in a case of adopting the object recognition unit 13 which is not able to obtain a distance, the predetermined size may be decided by taking a size of another moving body which is assumed into consideration.

Here, in a case where the degree-of-risk determination unit 10*a* has the plurality of types of determination conditions, which determination condition is to be used may be decided in accordance with user setting or automatic setting in the moving body 1. The moving body 1 is to include a setting unit, which is not illustrated, in order to allow user setting or automatic setting. By registering a risky route in the map information 14*a* in advance, the aforementioned automatic setting may be performed on the basis of a degree of risk thereof.

As steps of a determination condition, a certain type of a determination condition may be divided into, for example, 10 steps from being risky to being safe. For example, in a case of adopting the type of (a) above, 10 steps may be provided for the predetermined size, and, in a case of adopting the type of (b) above, 10 steps may be provided for the predetermined speed. In a case of adopting the type of (c) above, for example, weighting coefficients may be held so as to respectively correspond to positions in the detectable range of the object recognition unit 13, and a total of values obtained by respectively multiplying positions, at which an object is detected, by the weighting coefficients may be divided in accordance with thresholds of 10 steps.

Moreover, also in a case where the degree-of-risk determination unit 10*a* has, for a certain type of a determination condition, a plurality of steps of the determination condition, with which determination condition the speed is to be reduced (or how much the speed is to be reduced) may be decided in accordance with user setting, similar automatic setting, or the like. In a case of a degree of risk determined in accordance with a determination condition which is not to be used, for example, only warning display or an output of a warning sound may be performed.

Then, the speed instruction unit 10*b* in the present embodiment changes the predetermined period in accordance with the determination condition which is used in the degree-of-risk determination unit 10*a* (which is used for setting the target speed).

For example, in the example of FIG. 4A, determination is made as being risky in a case where the number of measurement points at each of which a distance is determined to be short is equal to or more than a predetermined number (in the example, 10), but, by providing another determination condition, determination is made as being risky in a case where an increasing degree of the number of measurement points (acceleration degree at which an object approaches) is equal to or more than a predetermined degree (predetermined increasing number per unit time).

Then, the predetermined period (the number of times of detecting safety) is to be changed in accordance with the determination condition on which determination is made as being risky. More specifically, since it is possible to judge a case where the acceleration degree is equal to or more than the predetermined one is riskier compared with the example of FIG. 4A, in a case of using the latter determination condition, the speed of the moving body 1 may be returned more slowly. However, in some cases, in accordance with a threshold of the number of measurement points (that is, a threshold of a distance) and a threshold of the acceleration degree, this relation is reversed, that is, in a case of using the former determination condition, the speed of the moving body 1 may be returned more slowly.

With such control, the predetermined period for acceleration after deceleration is changed in accordance with at least one determination condition which is to be used for setting the target speed, so that it is possible to shift from deceleration to acceleration correspondingly to the determination condition, and inhibit superfluous repetition of deceleration and acceleration.

(Third Embodiment)

Figure 5A:
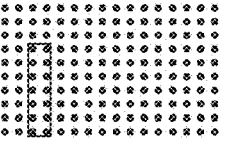
FIG. 5A is a view for explaining a process of, in a moving body according to a third embodiment of the invention, recognizing an obstacle with use of a laser range finder and setting a target speed in accordance with recognition results thereof.
Figure 5A:
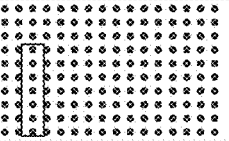
Figure 5A:
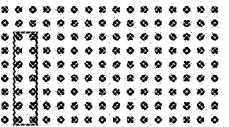
Figure 5A:
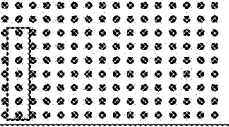
Figure 5A:
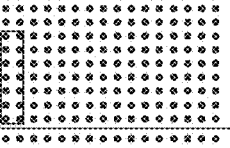
Figure 5A:
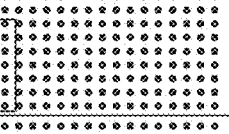
Figure 5A:
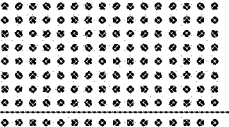
Figure 5A:
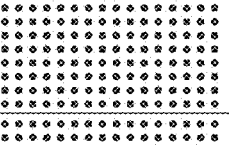
Figure 5A:
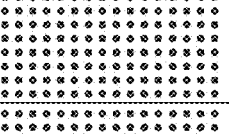
Figure 5A:
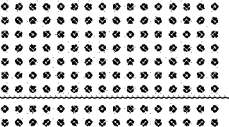
Figure 5A:
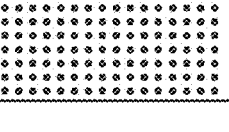
Figure 5B:
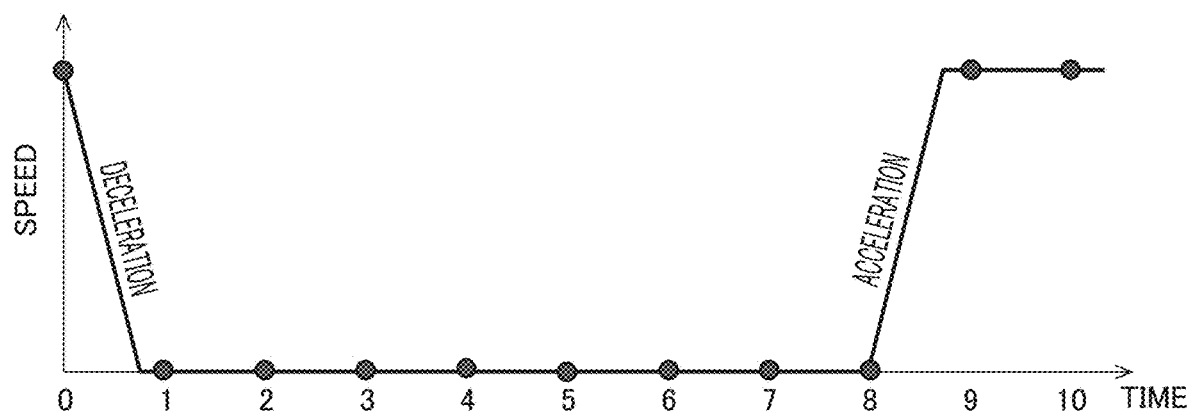
FIG. 5B is a view illustrating a change in a speed of the moving body in the process of FIG. 5A.

A third embodiment of the invention will be described with reference to FIG. 5A and FIG. 5B mainly. FIG. 5A is a view for explaining a process of, in a moving body according to the present embodiment, recognizing an obstacle with use of a laser range finder and setting a target speed in accordance with recognition results thereof, and FIG. 5B is a view illustrating a change in a speed of the moving body in the process of FIG. 5A. Note that, in the present embodiment, though description for overlapping parts with the first embodiment will be basically omitted, various applications, for example, described in the first embodiment are able to be applied.

In a case where determination is made as being risky by the degree-of-risk determination unit 10a while traveling at a first target speed, the speed instruction unit 10b in the present embodiment performs control of reducing the target speed of the moving body 1 to a second target speed (or by a predetermined speed), and returns the target speed of the moving body 1 to the first target speed when determination is made as being safe by the degree-of-risk determination unit 10a for a predetermined period in a state where the target speed has been reduced to the second target speed (or by the predetermined speed) by the control.

The speed instruction unit 10b changes the predetermined period in accordance with the first target speed, the second target speed, or the predetermined speed. Here, it is preferable to include a case where the second target speed is 0 (that is, a case of stop).

Such setting of the target speed will be described by citing examples of FIG. 4A and FIG. 5A. In the example of FIG. 4A, when determination is made as being risky, the target speed is reduced from a high speed (corresponding to the first target speed) to a low speed (corresponding to the second target speed), and thereafter returns the target speed to the high speed when determination is made as being safe five times (corresponding to the predetermined period) in series.

The example in FIG. 5A is an example of the same scene as that of FIG. 4A, but when determination is made as being risky while traveling at the target speed which is a low speed (corresponding to the first target speed), the target speed is brought into a stop state, and thereafter is returned to the low speed when determination is made as being safe four times (corresponding to the predetermined period) in series. The change in the speed in this case is as illustrated in FIG. 5B. In the example of FIG. 5A, since the returned speed is low and safe compared with the example of FIG. 4A, the speed is returned earlier. On the contrary, by taking the original speed into consideration and considering that the route is safer in a case where an original speed is high as in the example of FIG. 4A, the speed may be returned earlier compared with the example of FIG. 5A.

Without limitation to such examples, a predetermined period (the first number of times of detecting safety) until the target speed is returned to a high speed after control is performed from the high speed to a low speed may be different from a predetermined period (the second number of times of detecting safety) until, after control is performed from the high speed to stop, the target speed is returned to the original speed, for example. In this case, in setting in which a route is considered to be one in which stop is necessary at a time of being risky, by setting the second number of times of detecting safety to be a large number, it can be said that it is possible to travel in such a manner that risk is avoided better. Needless to say, also in this case, the first number of times of detecting safety may be a large number, on the contrary.

With such a control, the predetermined period for acceleration after deceleration is changed in accordance with a speed before deceleration or a speed after deceleration, so that it is possible to shift from deceleration to acceleration correspondingly to the speed before the deceleration or after the deceleration, and inhibit superfluous repetition of deceleration and acceleration.

In addition, also in the present embodiment, it is possible to apply the example which has been described in the second embodiment and in which a plurality of determination conditions that are to be used when determination is made as being risky by the degree-of-risk determination unit 10a are included. In this case, the speed instruction unit 10b may change the predetermined period in accordance with at least one of the plurality determination conditions to be used by the degree-of-risk determination unit 10a.

(Fourth Embodiment)

Figure 6:
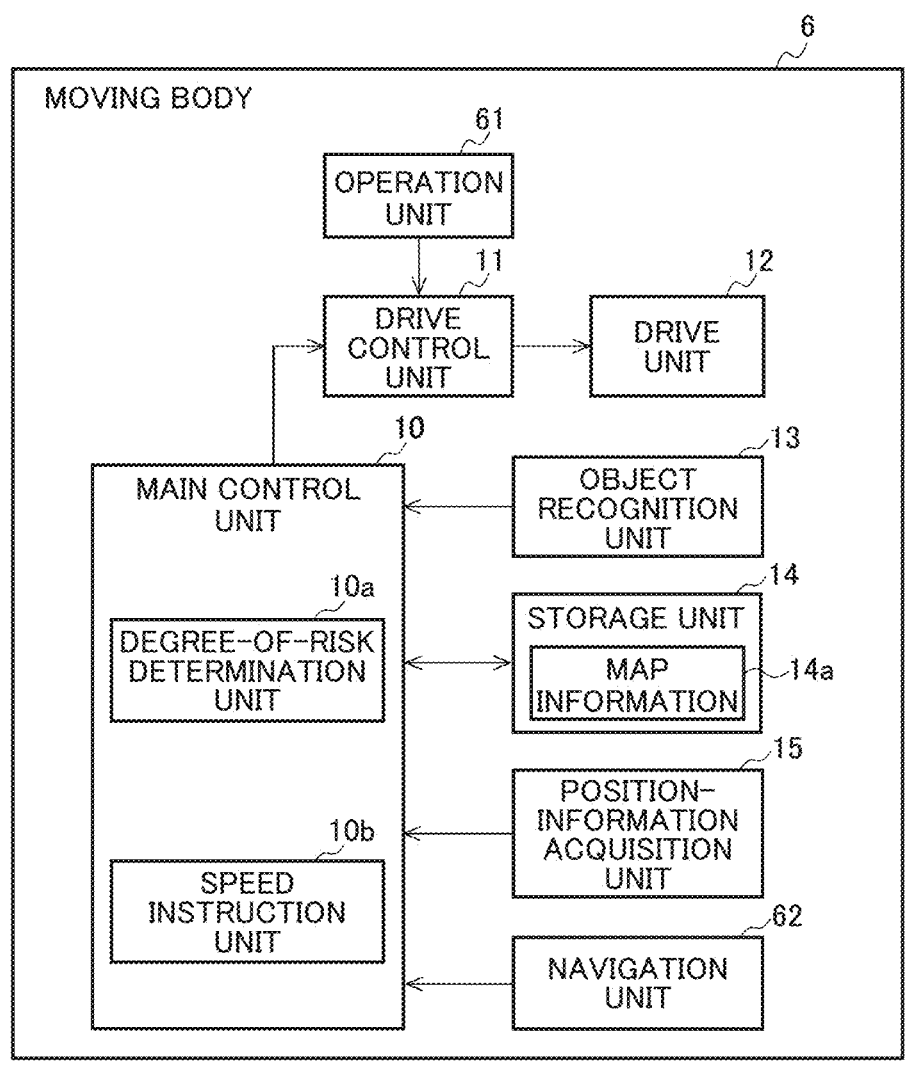
FIG. 6 is a block diagram illustrating a configuration example of a moving body according to a fourth embodiment of the invention.

A fourth embodiment of the invention will be described with reference to FIG. 6. FIG. 6 is a block diagram illustrating a configuration example of a moving body according to the present embodiment. Note that, in the present embodiment, though description for overlapping parts with the first embodiment will be basically omitted, various applications, for example, described in the first embodiment are able to be applied, and the present embodiment is able to be used together with any of the second and third embodiments.

In the first embodiment, the description has been given by citing the example in which the moving body 1 is an autonomous traveling apparatus. In addition to each of the units 11 to 15 of FIG. 3A, a moving body 6 according to the present embodiment, which is exemplified in FIG. 6, includes an operation unit 61 that receives a driving operation by a driver and a navigation unit 62 that performs navigation on a map, which is indicated by the map information 14a, on the basis of a current position acquired by the position-information acquisition unit 15. The operation unit 61 is constituted by a steering wheel, an accelerator, a brake, and the like.

The navigation unit 62 may cause the map indicated by the map information 14a to be displayed, and give guidance with a voice and route display so as to go to a destination registered by a driver or a fellow passenger in advance (that is, so as to go along a scheduled traveling route to the destination registered in the map information 14a), for example. Thus, the navigation unit 62 includes an image display unit and/or a voice output unit. Note that, an autonomous traveling function may be included also in the present embodiment, and, in this case, autonomous traveling may be assisted by driving by a driver, or incompletion of driving of a driver may be compensated by autonomous traveling.

REFERENCE SIGNS LIST 1, 6 moving body
10 main control unit
10a degree-of-risk determination unit
10b speed instruction unit
11 drive control unit
12 drive unit
12a wheel
13 object recognition unit
14 storage unit
14a map information
15 position-information acquisition unit
16 main body
61 operation unit
62 navigation unit

The invention claimed is:
1. A moving body, comprising:
a drive;
a processor that controls driving by the drive; and
an object recognition sensor that recognizes an object, wherein
the processor determines a degree of risk of collision with the object in accordance with a recognition result by the object recognition sensor, in a case where determination is made as being risky by the processor, the processor performs control of reducing a target speed of the moving body to be less than an original value of the target speed, and returns the target speed of the moving body to the original value of the target speed in a case where determination is made as being safe by the processor for a predetermined period in a state where the target speed has been reduced, the processor operates in accordance with a plurality of determination conditions that are to be used at a time of making determination as being risky, and the processor changes the predetermined period in accordance with at least one of the plurality of determination conditions that are to be used by the processor.

2. The moving body according to claim 1, further comprising:

a storage that stores map information that includes a scheduled traveling route of the moving body; and position-information acquisition circuitry that acquires position information indicating a position of the moving body, wherein the processor performs control of performing autonomous traveling along the scheduled traveling route on a basis of a current position acquired by the position-information acquisition circuitry.

3. The moving body according to claim 1, further comprising:

a storage that stores map information that includes a scheduled traveling route of the moving body;

position-information acquisition circuitry that acquires position information indicating a position of the moving body;

an operation control that receives a driving operation by a driver; and a navigation output that performs navigation on a map, which is indicated by the map information, on a basis of a current position acquired by the position-information acquisition circuitry.

4. A moving body, comprising:

a drive;

a processor that controls driving by the drive; and an object recognition sensor that recognizes an object, wherein the processor determines a degree of risk of collision with the object in accordance with a recognition result by the object recognition sensor, in a case where determination is made as being risky by the processor, the processor performs control of reducing a target speed of the moving body to be less than an original value of the target speed, and returns the target speed of the moving body to the original value of the target speed in a case where determination is made as being safe by the processor for a predetermined period in a state where the target speed has been reduced, and in a case where determination is made as being risky by the processor while traveling at a first target speed, the processor performs control of reducing the target speed of the moving body to a second target speed or by a predetermined speed, and returns the target speed of the moving body to the first target speed in a case where determination is made as being safe by the processor for the predetermined period in a state where the target speed has been reduced to the second target speed or by the predetermined speed, and changes the predetermined period in accordance with the first target speed, the second target speed, or the predetermined speed.

5. The moving body according to claim 4, wherein a case where the second target speed is 0 is included.

6. The moving body according to claim 4, wherein the processor operates in accordance with a plurality of determination conditions that are to be used at a time of making determination as being risky, and the processor changes the predetermined period in accordance with at least one of the plurality of determination conditions that are to be used by the processor.

7. The moving body according to claim 5, wherein the processor operates in accordance with a plurality of determination conditions that are to be used at a time of making determination as being risky, and the processor changes the predetermined period in accordance with at least one of the plurality of determination conditions that are to be used by the processor.

8. The moving body according to claim 4, further comprising:

a storage that stores map information that includes a scheduled traveling route of the moving body; and position-information acquisition circuitry that acquires position information indicating a position of the moving body, wherein the processor performs control of performing autonomous traveling along the scheduled traveling route on a basis of a current position acquired by the position-information acquisition circuitry.

9. The moving body according to claim 5, further comprising:

a storage that stores map information that includes a scheduled traveling route of the moving body; and position-information acquisition circuitry that acquires position information indicating a position of the moving body, wherein the processor performs control of performing autonomous traveling along the scheduled traveling route on a basis of a current position acquired by the position-information acquisition circuitry.

10. The moving body according to claim 6, further comprising:

a storage that stores map information that includes a scheduled traveling route of the moving body; and position-information acquisition circuitry that acquires position information indicating a position of the moving body, wherein the processor performs control of performing autonomous traveling along the scheduled traveling route on a basis of a current position acquired by the position-information acquisition circuitry.

11. The moving body according to claim 7, further comprising:

a storage that stores map information that includes a scheduled traveling route of the moving body; and position-information acquisition circuitry that acquires position information indicating a position of the moving body, wherein the processor performs control of performing autonomous traveling along the scheduled traveling route on a basis of a current position acquired by the position-information acquisition circuitry.

12. The moving body according to claim 4, further comprising:

a storage that stores map information that includes a scheduled traveling route of the moving body;

position-information acquisition circuitry that acquires position information indicating a position of the moving body;

an operation controller that receives a driving operation by a driver; and a navigation output that performs navigation on a map, which is indicated by the map information, on a basis of a current position acquired by the position-information acquisition circuitry.

13. The moving body according to claim 5, further comprising:

a storage that stores map information that includes a scheduled traveling route of the moving body;

position-information acquisition circuitry that acquires position information indicating a position of the moving body;

an operation controller that receives a driving operation by a driver; and a navigation output that performs navigation on a map, which is indicated by the map information, on a basis of a current position acquired by the position-information acquisition circuitry.

14. The moving body according to claim 6, further comprising:

a storage that stores map information that includes a scheduled traveling route of the moving body;

position-information acquisition circuitry that acquires position information indicating a position of the moving body;

an operation controller that receives a driving operation by a driver; and a navigation output that performs navigation on a map, which is indicated by the map information, on a basis of a current position acquired by the position-information acquisition circuitry.

15. The moving body according to claim 7, further comprising:

a storage that stores map information that includes a scheduled traveling route of the moving body;

position-information acquisition circuitry that acquires position information indicating a position of the moving body;

an operation controller that receives a driving operation by a driver; and a navigation output that performs navigation on a map, which is indicated by the map information, on a basis of a current position acquired by the position-information acquisition circuitry.

16. A driving method of a moving body, the moving body having a drive; and an object recognition sensor that recognizes an object, the driving method comprising;

determining a degree of risk of collision with the object in accordance with a recognition result by the object recognition sensor; and controlling driving by the drive, wherein, in a case where determination is made as being risky, control of reducing a target speed of the moving body to be less than an original value of the target speed is performed, and the target speed of the moving body is returned to the original value of the target speed, in a case where determination is made as being safe for a predetermined period in a state where the target speed has been reduced, the degree of risk of collision is determined in accordance with a plurality of determination conditions that are to be used at a time of making determination as being risky, and the predetermined period is changed in accordance with at least one of the plurality of determination conditions that are to be used to determine the degree of risk of collision.

* * * * *